(12) United States Patent
Zhao et al.

(10) Patent No.: US 11,955,653 B1
(45) Date of Patent: Apr. 9, 2024

(54) PALLET AND BATTERY RESTRAINT APPARATUS

(71) Applicant: CONTEMPORARY AMPEREX TECHNOLOGY CO., LIMITED, Ningde (CN)

(72) Inventors: Jiayi Zhao, Ningde (CN); Fangyu Huang, Ningde (CN); Sheng Tang, Ningde (CN); Zhihui Wang, Ningde (CN); Sizhe Lai, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/448,911

(22) Filed: Aug. 12, 2023

Related U.S. Application Data

(63) Continuation of application No. PCT/CN2022/132681, filed on Nov. 17, 2022.

(51) Int. Cl.
*H01M 50/244* (2021.01)
*H01M 50/204* (2021.01)
*H01M 50/227* (2021.01)
*H01M 50/264* (2021.01)

(52) U.S. Cl.
CPC ....... *H01M 50/244* (2021.01); *H01M 50/204* (2021.01); *H01M 50/227* (2021.01); *H01M 50/264* (2021.01)

(58) Field of Classification Search
CPC ............ H01M 50/244; H01M 50/204; H01M 50/227; H01M 50/264
See application file for complete search history.

(56) References Cited

U.S. PATENT DOCUMENTS

2021/0028514 A1* 1/2021 Park .................. G01K 1/026

FOREIGN PATENT DOCUMENTS

| CN | 108461685 A | | 8/2018 | |
|---|---|---|---|---|
| CN | 109713388 | * | 5/2019 | ............ Y02E 60/10 |
| CN | 109713388 A | | 5/2019 | |
| CN | 209582209 | * | 11/2019 | ............ B65D 19/26 |
| CN | 209582209 U | | 11/2019 | |
| CN | 210723257 U | | 6/2020 | |
| CN | 111948550 A | | 11/2020 | |
| CN | 211944190 U | | 11/2020 | |
| CN | 217281059 | * | 8/2022 | ............ Y02E 60/10 |
| CN | 217281059 U | | 8/2022 | |

(Continued)

OTHER PUBLICATIONS

English Translation of CN109713388.*

(Continued)

*Primary Examiner* — Kiran Quraishi Akhtar
(74) *Attorney, Agent, or Firm* — Kilpatrick Townsend & Stockton LLP

(57) ABSTRACT

Disclosed are a pallet configured to bear a battery cell. The pallet includes an external fixing rack and a plurality of supporting beams. A mounting space is formed inside the external fixing rack. The plurality of supporting beams are disposed in the mounting space. The plurality of supporting beams are arranged along a first direction. The plurality of supporting beams are connected to the external fixing rack separately. At least two of the supporting beams are spaced apart. The plurality of supporting beams are configured to bear the battery cell.

16 Claims, 7 Drawing Sheets

(56) References Cited

FOREIGN PATENT DOCUMENTS

| | | |
|---|---|---|
| CN | 115295944 A | 11/2022 |
| CN | 218101649 U | 12/2022 |
| JP | 2020119823 A | 8/2020 |

OTHER PUBLICATIONS

English Translation of CN209582209.*
English Translation of CN217281059.*
The international search report received in the corresponding international application PCT/CN2022/132681, dated Aug. 6, 2023.

* cited by examiner

PALLET AND BATTERY RESTRAINT APPARATUS

CROSS-REFERENCE TO RELATED APPLICATIONS

The present application is a continuation of International Application PCT/CN2022/132681, filed Nov. 17, 2022 and entitled "PALLET AND BATTERY RESTRAINT APPARATUS", the disclosure of which is incorporated herein by reference in its entirety.

TECHNICAL FIELD

This application relates to the field of battery processing equipment, and in particular, to a pallet and a battery restraint apparatus.

BACKGROUND

During a battery test, a battery needs to be mounted on a restraint pallet that includes a pallet, and the restraint pallet is used to bear the weight of the battery. Because the restraint pallet needs to bear the weight of a battery cell, the restraint pallet is usually designed as a plate-shaped structure as a whole, and the overall weight of the pallet product is very heavy.

SUMMARY

A main objective of this application is to disclose a pallet, and aims to solve the problem that the existing pallet structure is very heavy.

To achieve the foregoing objective, the pallet disclosed in this application is configured to bear a battery cell, and the pallet includes:

an external fixing rack, where a mounting space is formed inside the external fixing rack; and a plurality of supporting beams, disposed in the mounting space, where the plurality of supporting beams are arranged along a first direction, the plurality of supporting beams are connected to the external fixing rack separately, at least two of the supporting beams are spaced apart, and the plurality of supporting beams are configured to bear the battery cell.

In this example, in the mounting space formed by the external fixing rack, a plurality of supporting beams are disposed to form load-bearing parts. The battery cells are borne by the load-bearing parts so that the battery cells are kept in preset positions. The supporting beams are arranged in the first direction, and at least two of the supporting beams are spaced apart, thereby reducing the weight of the load-bearing parts, reducing the overall weight of the pallet, and in turn, making the pallet more lightweight.

In some examples, the external fixing rack and/or the supporting beams are of a hollow tubular structure; and/or the external fixing rack and/or the supporting beams are made of a carbon fiber material.

With the external fixing rack and/or supporting beams being in the hollow tubular shape, the overall weight of the pallet is reduced. With the external fixing rack and/or supporting beams being made of a carbon fiber material, the structural strength of the external fixing rack and/or supporting beams is increased. In addition, the overall quality of the pallet is enhanced by virtue of the corrosion-resistant performance of carbon fiber material.

In some examples, a first boss is disposed on one of the supporting beam or the external fixing rack, and a first slot is recessed in the other thereof. The first boss is plugged into the first slot to connect the supporting beams to the external fixing rack.

By plugging and fitting the first boss and the first slot together, the supporting beams and the external fixing rack can be assembled quickly, thereby improving the mounting performance of the pallet.

In some examples, the first boss is also bonded to the first slot; and/or the first boss is disposed on the external fixing rack, and the first boss is bonded to the external fixing rack.

The bonding between the first boss and the first slot avoids structural looseness and operation noise caused by wobbles of the supporting beams relative to the external fixing rack.

The bonding between the first boss and the external fixing rack enables fast mounting and fixing of the first boss, reduces direct destructive processing of the external fixing rack, and in turn, increases the structural strength of the external fixing rack.

In some examples, the pallet further includes: a first reinforcing piece, where at least one of the supporting beams is connected to the external fixing rack by the first reinforcing piece.

In these examples, at least one supporting beam is connected to the external fixing rack by the first reinforcing piece, so as to improve the deformation resistance performance of the supporting beam, and in turn, prevent deformation or dislocation of the supporting beam that bears a load.

In some examples, the first reinforcing piece is plural in number. The plurality of first reinforcing pieces are spaced apart along a second direction, and the second direction intersects the first direction.

In these examples, the plurality of first reinforcing pieces are spaced apart along the second direction, and can support and fix the supporting beams along the second direction, thereby increasing the overall strength of the supporting beams and improving the deformation resistance performance.

In some examples, the first reinforcing piece is plugged and/or bonded to the external fixing rack.

The plug-in connection and/or bonding between the reinforcing piece and the external fixing rack makes it convenient to fix the first reinforcing piece. In this way, the first reinforcing piece and the external fixing rack can be molded separately as required, and then assembled, thereby facilitating the molding and processing of individual structures.

In some examples, the supporting beams are plugged and/or bonded to the first reinforcing piece.

Because the first supporting beam is mounted on the external fixing rack, in these examples, the first reinforcing piece is fixed onto the supporting beam by plugging or bonding, so that the supporting beam and the first reinforcing piece can be molded separately, thereby facilitating the fast molding and processing of each component.

In some examples, the pallet further includes: a second reinforcing piece, where adjacent supporting beams are connected to each other by the second reinforcing piece.

In these examples, the second reinforcing piece is configured to connect adjacent supporting beams together, so that the adjacent supporting beams form an integral structure, thereby increasing the overall strength of a plurality of supporting beams, enhancing the overall deformation resistance performance of the plurality of supporting beams, and avoiding deformation or displacement of the supporting beams.

In some examples, the second reinforcing piece is plugged and/or bonded to the supporting beams.

In these examples, by plugging and/or bonding the second reinforcing piece and the supporting beams together, the second reinforcing piece and the supporting beams can be separately molded and then mounted conveniently, thereby improving the mounting performance of a plurality of components.

In some examples, each of the supporting beams includes a lower surface, and the lower surface of the supporting beam is a plane; and/or at least two of the supporting beams are arranged in parallel.

By making the lower surface of the supporting beam be a plane, during relocation of the pallet, the supporting structure may be fit the lower surface of the supporting beam to prevent the pallet from shifting. By disposing at least two supporting beams in parallel, during relocation of the pallet, two parallel supporting structures can coordinate with two parallel supporting beams on the pallet to improve stability of the pallet.

In some examples, a pin hole is made on the external fixing rack.

The pin hole in these examples may be configured to fit with the external structure to mount the pallet onto another structure, and may fit with another structure to prevent the pallet from shifting and facilitate the fixing or stacking of pallets.

In some examples, the pallet further includes: a limiting assembly, mounted in the external fixing rack, where the pin hole is made on the limiting assembly, and a via-hole is made on the external fixing rack at a position corresponding to the pin hole.

The limiting assembly in these examples is configured to form a pin hole. By mounting the limiting assembly inside the external fixing rack, it is convenient to limit the limiting assembly and keep the limiting assembly in a preset position, thereby preventing the limiting assembly from occupying the external space of the external fixing rack, and facilitating integral stacking and placement of the external fixing rack.

In some examples, the limiting assembly includes:
  a fixing block, fixedly mounted in the external fixing rack; and
  a pin sleeve, fixedly mounted on the fixing block, where the pin hole is made on the pin sleeve.

The fixing block in these examples is configured to be connected and fixed to the external fixing rack, and the pin sleeve is configured to form a pin hole. Because the pin sleeve is fixedly connected to the fixing block, a pin hole can be formed on the external fixing rack to facilitate the placement of the pallet.

In some examples, a first limiting hole and a second limiting hole communicating with the first limiting hole are made on the fixing block at a position corresponding to the via-hole. The second limiting hole is located between the first limiting hole and the via-hole. An inside diameter of the first limiting hole is greater than an inside diameter of the second limiting hole.

A limiting boss is disposed protrusively on an outer wall of the pin sleeve. A major outside diameter of the limiting boss is greater than the inside diameter of the second limiting hole. The limiting boss is plugged into the first limiting hole, and the pin sleeve is plugged into the second limiting hole.

In these examples, the first limiting hole and the second limiting hole communicate with each other. The first limiting hole and the second limiting hole with different inside diameters are used to form a stepped internal structure on the fixing block. The limiting boss on the pin sleeve is limited to the interior of the stepped fixing block, thereby limiting the position of the pin sleeve and preventing the pin sleeve from moving along an axial direction of the first limiting hole.

In some examples, a convex lug is disposed on the fixing block. The convex lug is connected and fixed to the external fixing rack.

In these examples, the convex lug may serve as an intermediate connecting piece between the fixing block and the external fixing rack to mount and fix the fixing block onto the external fixing rack, thereby making it convenient to mount the fixing block.

In some examples, the convex lug is disposed at an end that is of the fixing block and that is away from the via-hole.

By mounting the convex lug at the end that is of the fixing block and that is away from the via-hole, no structure such as a hole for connecting the convex lug needs to be disposed at the end that is of the external fixing rack and that is equipped with the via-hole, thereby reducing the hole making operations on the outer surface of the external fixing rack.

In some examples, the external fixing rack includes:
  two first fixing beams; and
  two second fixing beams, where the two first fixing beams and the two second fixing beams are connected alternately end-to-end along a third direction, so that the two first fixing beams and the two second fixing beams close in to form the mounting space.

Ends of at least two supporting beams are connected and fixed to the two first fixing beams respectively.

In these examples, the two first fixing beams are spaced apart, and the two second fixing beams are spaced apart. The two first fixing beams and the two second fixing beams are connected alternately end-to-end to form an approximately quadrilateral structure, so as to define a mounting space. The supporting beams are mounted in the mounting space. The ends of the supporting beams are connected to the two first fixing beams, so that the supporting beams are fixed onto the external fixing rack to implement fixing of the overall structure.

In some examples, a fifth boss is disposed protrusively on the second fixing beams, and a fifth slot is made on the first fixing beams. The fifth boss is plugged into in the fifth slot to connect the first fixing beams to the second fixing beams.

In these examples, the fifth boss is configured to fit with the fifth slot on the first fixing beams, so that the second fixing beams and the first fixing beams are connected and fixed to each other to form an integral framework structure of the external fixing rack.

In some examples, the fifth boss is also bonded to the fifth slot; and/or the fifth boss is plugged and/or bonded to the second fixing beams.

By bonding and fixing the fifth boss to the fifth slot, relative vibration between the fifth boss and the first fixing beams can be prevented, thereby improving stability of the pallet. In these examples, by bonding and fixing the fifth boss to the second fixing beams, the fifth boss and the second fixing beams can be molded separately, and then fixed to each other, thereby improving convenience of processing the fifth boss and the second fixing beams.

On the basis of the above pallet, this application further discloses an example of a battery restraint apparatus. The battery restraint apparatus is configured to restrain a battery cell. The battery restraint apparatus includes:

the pallet described in any one of the examples given above; and an end plate, where the end plate is connected to the external fixing rack.

In this example, the battery restraint apparatus can restrain the battery cell so that the battery cell can be kept in a preset position. The end plate is configured to limit the position of the battery cell to prevent the battery cell from moving toward the outside of the pallet, so that the battery cell can keep a steady state on the pallet.

In some examples, the external fixing rack includes an inner wall face oriented toward the mounting space and an outer wall face oriented away from the mounting space, and the pallet further includes: a connecting piece, connected to the external fixing rack and at least partly protruding from the outer wall face of the external fixing rack.

The end plate is connected to the external fixing rack by the connecting piece.

In these examples, the connecting piece protrudes from the outer wall of the external fixing rack. Therefore, the part that is of the connecting piece and that protrudes from the external fixing rack can be connected and fixed to the end plate conveniently, so as to implement mounting and fixing of the end plate.

BRIEF DESCRIPTION OF DRAWINGS

To describe the technical solutions in some embodiments of this application more clearly, the following outlines the drawings to be used in the description of some embodiments of this application. Evidently, the drawings outlined below are merely a part of embodiments of this application. A person of ordinary skill in the art may derive other drawings from the illustrated structure without making any creative effort.

Figure 1:
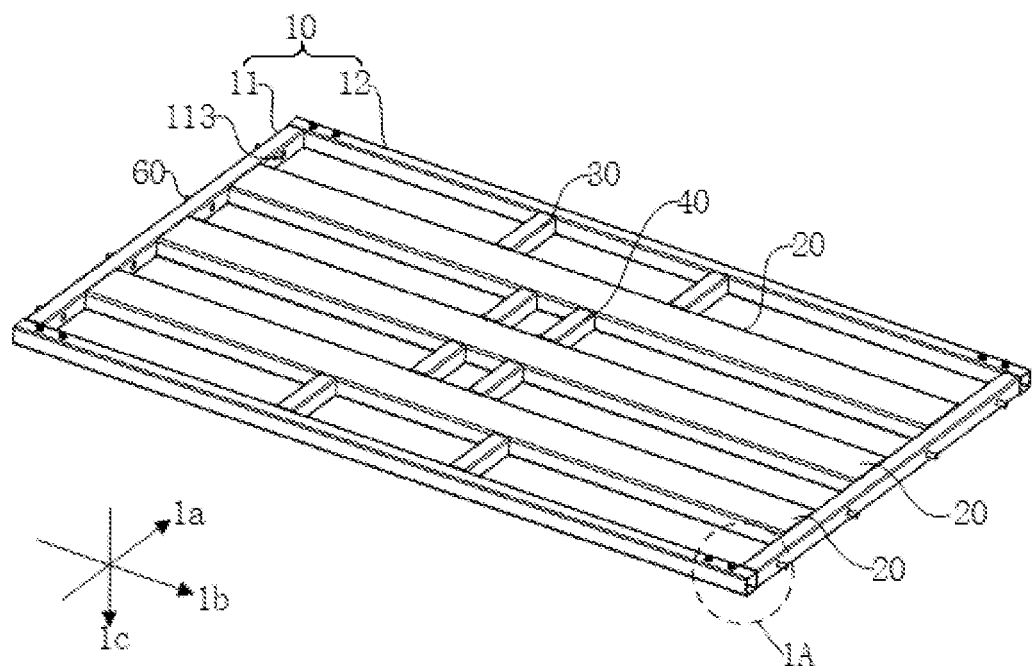
FIG. 1 is a schematic structural diagram of an example of a pallet according to this application.

| Reference numerals: | |
|---|---|
| Reference numeral | Name |
| 10 | External fixing rack |
| 111 | First boss |
| 113 | Reserved hole |
| 12 | Second fixing beam |
| 122 | Fifth boss |
| 124 | Screw hole |
| 21 | First slot |
| 23 | Fourth boss |
| 31 | Second slot |
| 50 | Limiting assembly |
| 511 | First limiting hole |
| 513 | Convex lug |
| 521 | Via-hole |
| 60 | Connecting piece |
| 70 | Restraint apparatus |
| 72 | Screw rod |
| 74 | Fixing plate |
| 11 | First fixing beam |
| 112 | Fifth slot |
| 114 | Threaded hole |
| 121 | Second boss |
| 123 | Pin hole |
| 20 | Supporting beam |
| 22 | Third boss |
| 30 | First reinforcing piece |
| 40 | Second reinforcing piece |
| 51 | Fixing block |
| 512 | Second limiting hole |
| 52 | Pin sleeve |
| 522 | Limiting boss |
| 61 | Gasket |
| 71 | End plate |
| 73 | Push plate |
| 80 | Battery cell |

The objective fulfillment, functional characteristics, and advantages of this application will be described in more detail with reference to the drawings.

DETAILED DESCRIPTION OF EMBODIMENTS

The following clearly and thoroughly describes the technical solutions in some embodiments of this application with reference to the drawings appended hereto. Evidently, the described embodiments are merely a part of but not all of the embodiments of this application. All other embodiments derived by a person of ordinary skill in the art based on the embodiments of this application without making any creative efforts still fall within the protection scope of this application.

It is hereby noted that all directional terms (for example, up, down, left, right, front, back, and so on), if any, used in the embodiments of this application are merely used to explain a relative position relationship between components as well as the motion status and the like of the components in a specific posture (as shown in the drawings). When the specific posture changes, the directional terms change accordingly.

In addition, if any technical terms such as "first" and "second" are used in an embodiment of this application, the terms such as "first" and "second" are merely intended for ease of description, but not intended to indicate or imply relative importance or implicitly specify the number of technical features mentioned. Therefore, the features preceded by "first" or "second" may explicitly or implicitly include at least one of such features. In addition, the technical solutions of different embodiments may be combined with each other to the extent practicable by a person of ordinary skilled in the art. When a combination of technical solutions is contradictory or impracticable, the combination of technical solutions is considered to be nonexistent and fall outside the protection scope claimed by this application.

With the development of battery technology, batteries have penetrated every aspect of work and life. Lithium batteries are applied everywhere, ranging from a battery as small as a mobile phone battery to a battery as large as a battery module of a new energy vehicle. Generally, a battery cell includes an electrode assembly. The electrode assembly includes a positive electrode, a negative electrode, and a separator. During charge and discharge of a battery cell, active ions (such as lithium ions) are shuttled between the positive electrode and the negative electrode by intercalation and deintercalation. Disposed between the positive electrode and the negative electrode, the separator serves to prevent a short circuit between the positive electrode and the negative electrode and allow passage of the active ions. An active material layer of the positive electrode and an active material layer of the negative electrode are made of different materials. The most commonly used positive electrode materials include lithium cobalt oxide, lithium manganese oxide, lithium iron phosphate, and a ternary material (a nickel-cobalt-manganese polymer). Negative electrode materials used currently include natural graphite and artificial graphite primarily, and also include nitride, PAS, tin-based oxide, tin alloy, nanometric negative electrode material, and other intermetallic compounds. Some processes of manufacturing an electrode assembly involve slurry preparation, coating, cold pressing, winding, hot pressing, assembling, electrolyte injection, and chemical formation.

In a process of manufacturing a battery cell, in order to support the weight of the battery cell, a pallet needs to be disposed at the bottom of the battery cell. The pallet supports the battery cell so that the battery cell can move to a preset position as required. In some circumstances, the pallet as a whole is of a sheet structure, so as to bear the total weight of the battery cell. However, this practice increases the weight of the pallet, and greatly increases energy consumption in the chemical formation process.

Figure 2:
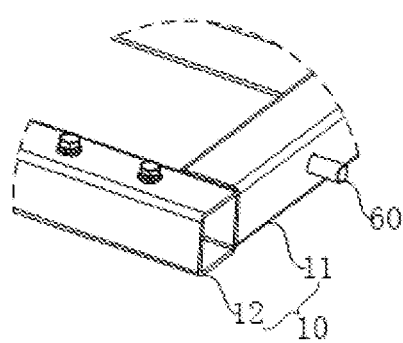
FIG. 2 is a close-up view of a part 1A shown in FIG. 1.

Referring to FIG. 1 and FIG. 2, an example of this application discloses a pallet configured to bear a battery cell. The pallet includes an external fixing rack 10 and a plurality of supporting beams 20. A mounting space is formed inside the external fixing rack 10. The plurality of supporting beams 20 are disposed in the mounting space. The plurality of supporting beams 20 are arranged along a first direction (that is, the 1*a* direction shown in FIG. 1). The plurality of supporting beams 20 are connected to the external fixing rack 10 separately. At least two of the supporting beams 20 are spaced apart. The plurality of supporting beams 20 are configured to bear the battery cell 80.

The external fixing rack 10 forms an integral framework that includes a mounting space. The external fixing rack 10 may be a framework structure that is approximately rectangular. The mounting space is formed inside the external fixing rack 10 so that the external fixing rack 10 forms a hollow framework as a whole.

There are a plurality of supporting beams 20. The plurality of supporting beams 20 are all mounted in the mounting space. That is, the plurality of supporting beams 20 are all mounted inside the external fixing rack 10. The supporting beams 20 are configured to bear the battery cell 80 so that the battery cell 80 is kept in a preset position. The supporting beams 20 are connected to the external fixing rack 10 so that the plurality of supporting beams 20 can move synchronously with the external fixing rack 10. The plurality of supporting beams 20 are arranged along a first direction. The first direction may be a length direction or a width direction of the external fixing rack 10. In this example, the first direction is the width direction of the external fixing rack 10.

In this example, the plurality of supporting beams 20 form supporting parts configured to bear battery cells 80, and the supporting beams 20 form a supporting surface configured to support the battery cells 80. Among the plurality of supporting beams 20, at least two supporting beams 20 are spaced apart, which means that at least two supporting beams 20 are separated from each other, and the corresponding two supporting beams 20 are disconnected from each other. Because the supporting beams 20 may be spaced apart, the supporting parts formed by the plurality of supporting beams 20 do not unite into a whole, and clearances are formed between the supporting parts configured to support the battery cells 80. In this way, the supporting surface formed by the supporting beams 20 is prevented from forming a complete plane when the supporting beams 20 bear the battery cells 80.

The clearances between the formed supporting parts reduce the overall weight of the supporting parts, and in turn, reduce the weight of the pallet. The external fixing rack 10 can form an external framework of the pallet. Therefore, the battery cells 80 are mounted on the supporting beams 20 inside the external fixing rack 10, and the supporting beams 20 bear the weight of the battery cells 80. The battery cells 80 are borne by the supporting beams 20 that are spaced apart. No mutual traction force exists between the supporting beams 20 that are spaced apart. When the battery cells 80 are mounted on the pallet, the weight of the battery cells 80 exerted on the spaced supporting beams 20 is dispersed. Even if a single supporting beam 20 is deformed, no mutual traction force exists between the supporting beams 20, thereby preventing deformation of the supporting parts as a whole caused by the interaction between the supporting beams 20, where the supporting parts are formed by the plurality of supporting beams 20. Because the plurality of supporting beams 20 are connected to the external fixing rack 10 separately, it is convenient to connect and fix each supporting beam 20 to the external fixing rack 10 separately during the mounting, thereby improving the mounting performance of the supporting beams 20.

In a chemical formation process of the battery cell 80, the battery cell 80 needs to be moved to a preset workspace together with the pallet. In this example, the two supporting beams 20 spaced apart may fit with the external supporting structure separately. In this way, the external supporting structure acts on the plurality of supporting beams 20 separately, so as to disperse the relative acting force exerted by the external supporting structure on the pallet. When the pallet interacts with the external supporting structure, due to the clearance between the supporting beams 20, the parts of the external supporting structure, which are configured to bear the pallet, can be staggered from each other, thereby preventing mutual interference between the plurality of bearing parts of the external supporting structure. In a chemical formation process, the battery cell 80 is in an environment with an electrolytic solution. When the electrolytic solution flows onto the pallet, the electrolytic solution can flow out along the clearances between adjacent supporting beams 20, thereby preventing the accumulated electrolytic solution on the pallet from corroding the pallet. When the electrolytic solution flows out along the clearances between the adjacent supporting beams 20, the battery cells 80 mounted on the pallet are not prone to slide relative to the pallet, thereby improving the stability of the battery cells 80.

In some examples, there are at least two groups of battery cells 80, and each group includes at least one battery cell 80. The number of groups of battery cells 80 is the same as the number of supporting beams 20. Each supporting beam 20 bears a group of battery cells 80 correspondingly, so that the plurality of groups of battery cells 80 do not interfere with each other. The supporting beams 20 that bear different groups of battery cells 80 do not interfere with each other. Therefore, one supporting beam 20 that is deformed does not affect other supporting beams 20, thereby preventing the overall deformation of the pallet.

In some examples, the pallet includes a plurality of supporting beams 20 arranged along the first direction. The plurality of supporting beams 20 are spaced apart along the first direction. In this way, each supporting beam 20 is separated from an adjacent supporting beam 20, and each supporting beam 20 does not interfere with the adjacent supporting beam 20.

In some examples, the external fixing rack 10 is a rectangular framework structure. The mounting space is approximately rectangular. A plurality of supporting beams 20 are mounted in the mounting space. Further, in some examples, at least two supporting beams 20 are arranged parallel to the length direction of the external fixing rack 10. The two parallel supporting beams 20 are kept apart from each other, and apart from the adjacent supporting beam 20, by a clearance, so that the two parallel supporting beams 20 can be configured to bear the battery cells 80 separately.

In some examples, the thickness of the supporting beam 20 is equal to the thickness of the external fixing rack 10. In this way, when the pallet is placed on a preset platform, both the supporting beam 20 and the external fixing rack 10 can be supported on the preset platform. In some examples, the thickness of the supporting beam 20 is less than the thickness of the external fixing rack 10. In this way, when the external fixing rack 10 is supported on the preset platform, the supporting beam 20 is suspended above the preset platform.

Referring to FIG. 2 to FIG. 6, in some examples, the external fixing rack 10 is an integral framework structure, and the supporting beam 20 is fixed on the external fixing rack 10 that is in an integrity state. In some examples, the external fixing rack 10 is a framework structure formed by combining a plurality of fixing beams.

Referring to FIG. 1, FIG. 7, FIG. 8, and FIG. 9, further, in some examples, a plurality of supporting beams 20 are arranged parallel to each other. In some examples, the plurality of supporting beams 20 include a first beam and a last beam along the first direction. The first beam and the last beam are the supporting beams 20 located at two ends of the first direction respectively. The first beam and the last beam are arranged parallel to each other. Moreover, the first beam and the last beam are kept apart from the supporting beams 20 adjacent to the first beam and the last beam, so that the first beam and the last beam form independent supporting parts separately. In some examples, an intermediate beam exists between the first beam and the last beam. The intermediate beam is disposed apart from the first beam and the last beam. In some examples, three supporting beams 20 mentioned in any one of the above examples are mounted inside the external fixing rack 10. The three supporting beams 20 are spaced apart along the first direction. The three supporting beams 20 are arranged parallel to each other. Two supporting beams 20 located at two ends of the first direction are a first beam and a last beam respectively. The first beam and the last beam are connected to the external fixing rack 10 separately through the first reinforcing piece 30 mentioned in any one of the above examples. The supporting beam 20 in the middle is an intermediate beam. The intermediate beam is connected and fixed to the first beam and the last beam through the second reinforcing piece 40 mentioned in any one of the above examples.

Referring to FIG. 3, FIG. 4, FIG. 5, and FIG. 6, in some examples, the external fixing rack 10 is of a hollow tubular structure. In this way, the external fixing rack 10 as a whole is of a hollow structure, thereby reducing the overall weight of the external fixing rack 10. The external fixing rack 10 may be integrally injection-molded, and may be formed by a combination of injection molding, winding, bending, or the like. Further, in some examples, the external fixing rack 10 is a whole. The external fixing rack 10 is defined by a tubular structure. In some examples, the external fixing rack 10 is a framework structure formed by combining a plurality of hollow tubular structures.

In some embodiments, the external fixing rack 10 is made of a carbon fiber material. The carbon fiber material is a composite material formed by soaking and fusing carbon fiber bundles constructed from a resin matrix and short fibers. During processing, a molten prepreg containing the resin matrix and the carbon fiber bundles is added into a preset mold. The product in the mold forms a preset shape. The external fixing rack 10 is formed from a carbon fiber material to effectively enhance the overall corrosion resistance performance and structural strength of the external fixing rack 10. In this way, the battery cell 80 is not prone to corrosion and abrasion in an electrolytic solution environment during chemical formation.

In some examples, the supporting beam 20 is of a hollow tubular structure, thereby reducing the overall weight of the supporting beam 20, and in turn, implementing the lightweight design of the pallet. In these examples, the supporting beam 20 may be a hollow tubular shape that is integrally injection-molded, or may be formed by a combination of injection molding, winding, bending, and the like. In these examples, the supporting beam 20 may be made by the same process as the external fixing rack 10.

In some examples, the supporting beam 20 is made of the carbon fiber material mentioned in the above example. Further, the supporting beam 20 may be made of the same material as the external fixing rack 10.

Figure 3:
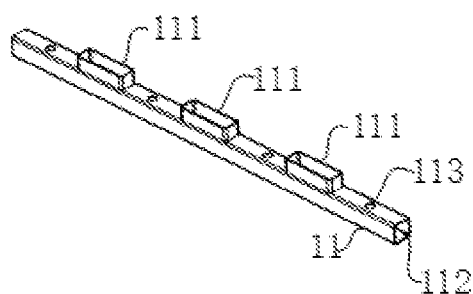
FIG. 3 is a schematic structural diagram of an example of a first fixing beam according to this application.
Figure 4:
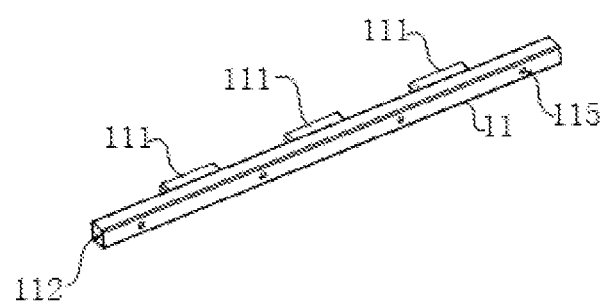
FIG. 4 is a schematic structural diagram of another example of a first fixing beam according to this application.
Figure 5:
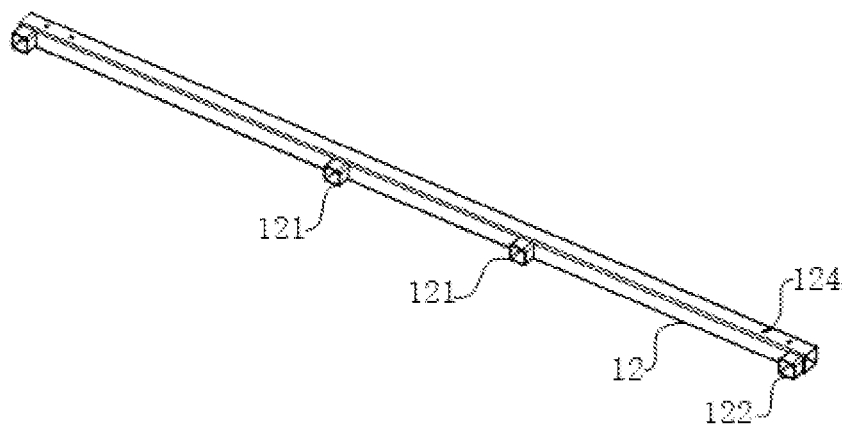
FIG. 5 is a schematic structural diagram of an example of a second fixing beam according to this application.
Figure 7:
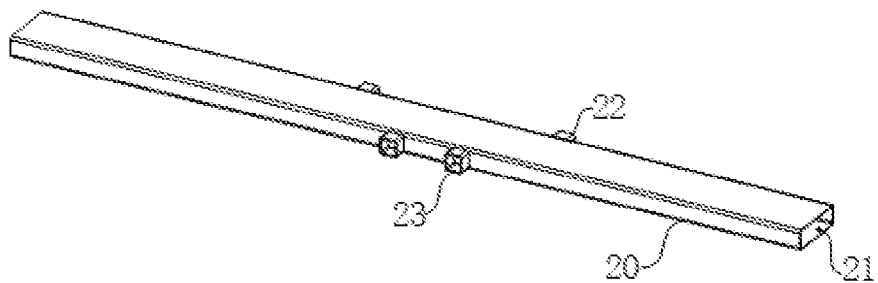
FIG. 7 is a schematic structural diagram of an example of a supporting beam according to this application.

Referring to FIG. 3, FIG. 4, and FIG. 7, in some examples, a first boss 111 is disposed on one of the supporting beams 20 or the external fixing rack 10, and a first slot 21 is recessed in the other thereof. The first boss 111 is plugged into the first slot 21 to connect the supporting beams 20 to the external fixing rack 10. The first boss 111 fits with the first slot 21 to implement connection and fixing between the supporting beam 20 and the external fixing rack 10. The plug-in fixing manner facilitates connection between the supporting beam 20 and the external fixing rack 10, and enables quick assembling of the supporting beam 20 and the external fixing rack 10.

Further, in some examples, a first slot 21 is disposed on the supporting beam 20, and a first boss 111 is disposed on the external fixing rack 10. The first boss 111 is plugged in the first slot 21. In some examples, the first slot 21 is a groove made at an end of the supporting beam 20. In some examples, the supporting beam 20 is of a hollow tubular structure as a whole. The first slot 21 is a groove defined by an inner wall face of the supporting beam 20. In some examples, the external fixing rack 10 and the first boss 111 are formed in one piece, so that the external fixing rack 10 and the first boss 111 can be quickly formed. Further, in some examples, both the external fixing rack 10 and the first boss 111 are made of the carbon fiber material mentioned in any one of the above examples, so as to increase the overall structural strength of the pallet.

In some examples, the first boss 111 is disposed on the supporting beam 20. The first boss 111 and the supporting beam 20 may be formed in one piece, or the first boss 111 is fixedly mounted on the supporting beam 20 after the supporting beam 20 and the first boss 111 are formed separately. The first slot 21 is disposed on the external fixing rack 10. The first slot 21 may be a groove made on the external fixing rack 10. In this way, the first slot 21 can be formed at the same time as the external fixing rack 10.

In some examples, both the first boss 111 and the first slot 21 are disposed on the supporting beam 20, and both the first boss 111 and the first slot 21 are disposed on the external fixing rack 10 at the same time. The first boss 111 on the supporting beam 20 is plugged into the first slot 21 on the external fixing rack 10. The first boss 111 on the external fixing rack 10 is plugged into the first slot 21 on the supporting beam 20, thereby implementing mutual plug-in connection and fixing between the two components.

In some examples, the first boss 111 is also bonded to the first slot 21. After the first boss 111 is plugged into the first slot 21, a clearance between the outer wall face of the first boss 111 and the inner wall face of the first slot 21 is filled with a binder, so as to bond and fix the first boss 111 to the inner wall face of the first slot 21, thereby preventing the first boss 111 from moving relative to the first slot 21, preventing the supporting beam 20 from vibrating relative to the external fixing rack 10, and in turn, improving the stability of the supporting beam 20. In addition, because the clearance between the first boss 111 and the inner wall face of the first slot 21 can be filled with the binder, liquids such as electrolytic solution are prevented from entering the clearance between the first boss 111 and the first slot 21, thereby preventing the accumulated electrolytic solution inside the supporting beam 20 or external fixing rack 10 from causing problems such as corrosion inside the pallet. In a chemical formation process of the battery cell 80, it is necessary to keep the battery cell 80 in a relatively clean environment. The binder in these examples fills the clearance at the junctions between the external fixing rack 10 and the supporting beam 20, thereby preventing the accumulated impurities in the clearance between the two components from entering the chemical formation equipment of the battery cell 80, and in turn, preventing equipment pollution and improving product processing quality.

When the first boss 111 is plugged into and fits with the first slot 21, a clearance exists between the first boss 111 and the first slot 21, and therefore, the corresponding structures may wobble to some extent. After the clearance between the first boss 111 and the first slot 21 is filled with the binder, the binder is in a deformable state before being solidified. Therefore, a to-be-bonded object may be moved relatively before the binder is solidified, thereby adjusting the relative position between the corresponding structures.

In some examples, a first boss 111 is disposed on the external fixing rack 10, and the first boss 111 is bonded to the external fixing rack 10. In these examples, the first boss 111 is mounted on the external fixing rack 10, and the first slot 21 mentioned in any one of the above examples is disposed on the supporting beam 20. The first boss 111 and the external fixing rack 10 are discrete structures, and the first boss 111 is bonded to the external fixing rack 10 to implement mounting and fixing of the first boss 111. In these examples, after the first boss 111 and the external fixing rack 10 are molded separately, the first boss 111 may be bonded onto the external fixing rack 10, so as to mold the two components independently, improve the molding efficiency, and simplify the processing and design of the mold. The clearance between the first boss 111 and the external fixing rack 10 may be filled with the binder to prevent corrosion or abrasion at the junction between the first boss 111 and the external fixing rack 10 and improve product quality.

By bonding the two components with the binder, the mounting position of the first boss 111 on the external fixing rack 10 can be adjusted before the binder is solidified, so as to implement adjustability of the position of the first boss 111. Due to the fit between the first boss and the supporting beam 20, when the position of the first boss 111 is adjusted, the relative position of the supporting beam 20 will also change, thereby facilitating the adjustment of the relative position of the supporting beam 20 and reducing the mounting error of the supporting beam 20.

In these examples, after the first boss 111, the external fixing rack 10, and the supporting beam 20 are molded, the first boss 111 may be plugged into the first slot 21 of the supporting beam 20 first, and then the first boss 111 is bonded to the external fixing rack 10. Further, in some examples, after the first boss 111 is plugged into the first slot 21, the clearance between the outer wall face of the first boss 111 and the inner wall face of the first slot 21 is filled with a binder, and the binder bonds and fixes the first boss 111 to the external fixing rack 10.

Further, in some examples, the first boss 111 is made of the carbon fiber material mentioned in any one of the above examples, so as to enhance the structural strength and corrosion-resistance performance of the first boss 111.

Figure 9:
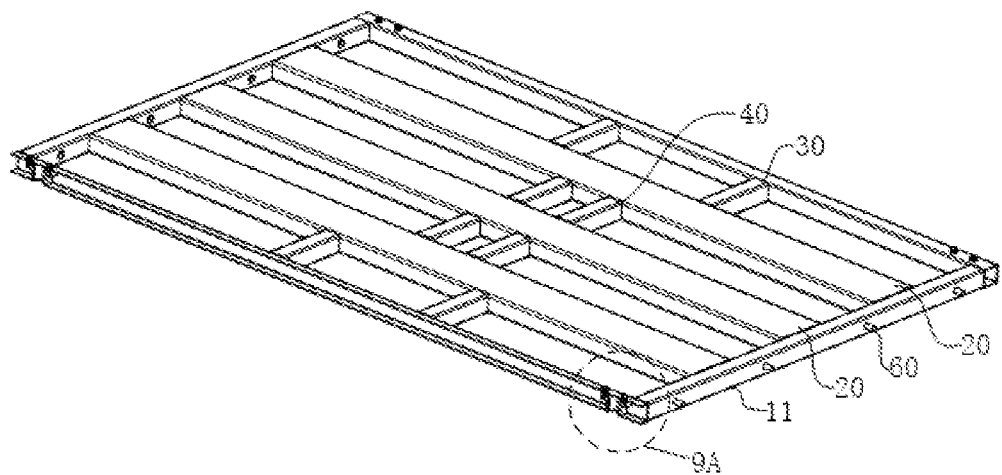
FIG. 9 is a schematic structural diagram of another example of a pallet according to this application.

Referring to FIG. 1, FIG. 7, and FIG. 9, in some examples, the pallet further includes a first reinforcing piece 30. At least one of the supporting beams 20 is connected to the external fixing rack 10 by the first reinforcing piece 30. The supporting beam 20 includes ends configured to be connected to the external fixing rack 10. The ends may be two ends of the supporting beam 20 in the length direction. The first reinforcing piece 30 is disposed at a position between the two ends of the supporting beam 20 in the length direction, and is configured to connect the external fixing rack 10 to a position close to the middle of the supporting beam 20, so as to avoid deformation of the position close to the middle of the supporting beam 20.

In these examples, the supporting beam 20 includes a first end and a second end arranged along the length direction. The first reinforcing piece 30 is located between the first end and the second end of the supporting beam 20 and is configured to connect and fix the external fixing rack 10 to the part that is of the supporting beam 20 and that is located between the first end and the second end, thereby preventing deformation of the part that is of the supporting beam 20 and that is away from the ends under pressure. In these examples, the first reinforcing piece 30 may be disposed at a middle position in the length direction of the supporting beam 20, or the first reinforcing piece 30 may be disposed at a position close to the lengthwise middle of the supporting beam 20.

Further, in some examples, there are a plurality of first reinforcing pieces 30. The plurality of first reinforcing pieces 30 are spaced apart, so as to reinforce and support the supporting beam 20 from different positions. In these examples, the plurality of first reinforcing pieces 30 may be arranged at preset equal intervals, or the plurality of first reinforcing pieces 30 may be arranged at unequal intervals.

In some examples, the first reinforcing piece 30 is plural in number. At least one first reinforcing piece 30 is connected to each supporting beam 20. Each first supporting beam 20 is connected and fixed to the external fixing rack 10 by at least one first reinforcing piece 30 separately.

In some examples, the first reinforcing piece 30 is plural in number. The plurality of first reinforcing pieces 30 are spaced apart along a second direction (that is, the 1b direction shown in FIG. 1). The second direction intersects the first direction.

In these examples, the plurality of first reinforcing pieces 30 spaced apart along the second direction serve to support and reinforce the supporting beams 20, thereby preventing the supporting beams 20 from deforming. Because a plurality of supporting beams 20 are arranged along the first direction, the first reinforcing pieces 30 in these examples are spaced apart along the second direction that intersects the first direction, thereby serving to support the supporting beams 20 from different positions.

In these examples, the second direction intersecting the first direction means that the first direction and the second direction are not parallel to each other when projected on a plane parallel to the upper surface of the pallet.

Further, in some examples, the first direction may be a width direction of the external fixing rack 10, the second direction may be a length direction of the external fixing rack 10, and the length direction of the supporting beam 20 may be parallel to the length direction of the external fixing rack 10, so that the first reinforcing pieces 30 are spaced apart along the length direction of the supporting beam 20.

To reduce the overall weight of the pallet, in some examples, the first reinforcing piece 30 is of a hollow tubular structure. The first reinforcing piece 30 may be a tube with a polygonal cross-section, or a hollow structure formed by at least one of injection molding, winding, bending, or other processes.

In some examples, the first reinforcing piece 30 is plugged to the external fixing rack 10. By fixing the two components by plugging or other means, the first reinforcing piece 30 can be quickly connected and fixed to the external fixing rack 10 conveniently.

Further, in some examples, a second slot 31 is disposed in one of the first reinforcing piece 30 or the external fixing rack 10, and a second boss 121 is disposed on the other thereof. The second boss 121 is plugged into the second slot 31. Further, in these examples, the second boss 121 is disposed on the external fixing rack 10, and the second slot 31 is made on the first reinforcing piece 30.

Further, in some examples, the first reinforcing piece 30 is of a hollow tubular structure, the second slot 31 is a hollow part inside the first reinforcing piece 30, and the second boss 121 is plugged onto the first reinforcing piece 30. Further, in some examples, the external fixing rack 10 and the second boss 121 may be formed in one piece to facilitate integral molding, thereby increasing the structural strength of the junction between the external fixing rack 10 and the second boss 121. In these examples, the second boss 121 and the external fixing rack 10 are molded separately, and then the second boss 121 is fixed to the external fixing rack 10 by bonding, snap-fastening, or other means.

In some examples, the second boss 121 is bonded to the inner wall face of the second slot 31 to prevent the first reinforcing piece 30 from wobbling relative to the second boss 121, thereby increasing the structural strength and stability of the first reinforcing piece 30. The binder that fills the clearance between the second boss 121 and the second slot 31 can prevent impurities such as electrolytic solution from entering the clearance between the second boss 121 and the second slot 31, thereby facilitating subsequent cleaning of the pallet and preventing the pallet from being contaminated.

In some examples, the first reinforcing piece 30 is bonded to the external fixing rack 10. In these examples, after the first reinforcing piece 30 and the external fixing rack 10 are molded separately, the first reinforcing piece 30 is bonded and fixed to the external fixing rack 10 by a binder.

Further, in some examples, after the first reinforcing piece 30, the external fixing rack 10, and the supporting beam 20 are molded separately, the second boss 121 is bonded to the external fixing rack 10, and then the second boss 121 on the external fixing rack 10 is plugged into the second slot 31 on the first reinforcing piece 30. The clearance between the inner wall face of the second slot 31 and the outer wall face of the second boss 121 is filled with the binder.

Referring to FIG. 1, FIG. 7, and FIG. 9, in some examples, the supporting beam 20 is connected to the first reinforcing piece 30 by plugging. In these examples, a third slot (not shown in the drawing) is made on one of the supporting beam 20 or the first reinforcing piece 30, and a third boss 22 is disposed on the other thereof. The third boss 22 is plugged into the third slot.

Further, the third boss 22 is disposed protrusively on a side that is of the supporting beam 20 and that is oriented toward the external fixing rack 10, and the third slot is recessed on a side that is of the first reinforcing piece 30 and that is oriented away from the external fixing rack 10. When the first reinforcing piece 30 is of a hollow structure, the third slot is a part of the hollow part in the first reinforcing piece 30. Further, in these examples, the outer wall face of the third boss 22 is bonded to the inner wall face of the third slot, so as to prevent the first reinforcing piece 30 from wobbling relative to the supporting beam 20. In addition, the clearance between the third boss 22 and the inner wall face of the third slot is filled with the binder to improve the cleaning performance of the pallet. In these examples, the third boss 22 and the supporting beam 20 may be formed in one piece. In these examples, the third boss 22 and the supporting beam 20 may be molded separately instead, and the third boss 22 may be plugged or bonded to the supporting beam 20.

In some examples, the supporting beam 20 is connected to the first reinforcing piece 30 by bonding. The end of the first reinforcing piece 30 may be directly bonded to the supporting beam 20, or the first reinforcing piece 30 may be bonded to the supporting beam 20 through an intermediate connecting piece. Further, in these examples, the third boss 22 mentioned in any one of the above examples may be disposed on the supporting beam 20. The first reinforcing piece 30 is bonded and fixed to the third boss 22 to enhance the structural stability of the first reinforcing piece 30 and prevent relative abrasion between the first reinforcing piece 30 and the supporting beam 20.

Figure 8:
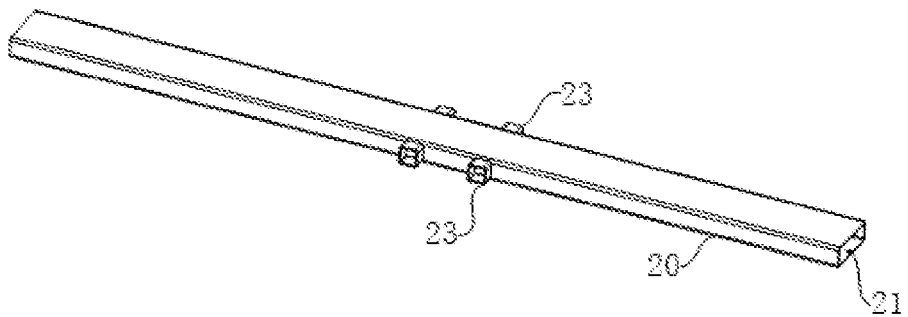
FIG. 8 is a schematic structural diagram of another example of a supporting beam according to this application.

Referring to FIG. 7, FIG. 8, and FIG. 9, in some examples, the pallet further includes a second reinforcing piece 40. Adjacent supporting beams 20 are connected by the second reinforcing piece 40. In these examples, the second reinforcing piece 40 is configured to connect and fix the adjacent supporting beams 20 to improve the mechanical performance of the adjacent supporting beams 20.

In some examples, there is a clearance between adjacent supporting beams 20, and the second reinforcing piece 40 is disposed between the adjacent supporting beams 20.

In some examples, adjacent supporting beams 20 are contiguous to each other, and the second reinforcing piece 40 is disposed on a side of the supporting beam 20 along a fourth direction (that is, the 1c direction in FIG. 1). The fourth direction is perpendicular to the first direction and the second direction. Further, the fourth direction is a thickness direction of the pallet, and the second reinforcing piece 40 is disposed on a side of the supporting beam 20 in the thickness direction. In some examples, the second reinforcing piece 40 and any one of the supporting beams 20 may be formed in one piece. The second reinforcing piece 40 is connected and fixed to adjacent supporting beams 20, so that the second reinforcing piece 40 can serve to connect two adjacent supporting beams 20.

In some examples, the second reinforcing piece 40 is identical to the first reinforcing piece 30 in any one of the above examples in at least one of the following aspects: shape, dimensions, and material. In some examples, the second reinforcing piece 40 is plural in number. The plurality of second reinforcing pieces 40 are spaced apart along the second direction. Further, in some examples, the number of second reinforcing pieces 40 is identical to the number of the first reinforcing pieces 30 in any one of the above examples. In some examples, in the first direction, the number and position of the first reinforcing pieces 30 in any one of the preceding examples are identical to the number and position of the second reinforcing pieces 40 in these examples. In some examples, in the first direction, the positions of the first reinforcing pieces 30 in any one of the preceding examples are staggered from the positions of the second reinforcing pieces 40 in these examples. The position of the first reinforcing piece 30 being identical to the position of the second reinforcing piece 40 in the first direction means that the projections of the first reinforcing piece 30 and the second reinforcing piece 40 overlap each other when the two reinforcing pieces are projected along the first direction. The position of the first reinforcing piece 30 being staggered from the second reinforcing piece 40 in the first direction means that the projections of the first reinforcing piece 30 and the second reinforcing piece 40 are staggered from each other when the two reinforcing pieces are projected along the first direction.

Referring to FIG. 1, FIG. 7, and FIG. 8, in some examples, the second reinforcing piece 40 is connected to the supporting beam 20 by plugging. In these examples, a fourth slot (not shown in the drawing) is made on one of the second reinforcing piece 40 and the supporting beam 20, and a fourth boss 23 is disposed protrusively on the other thereof. The fourth boss 23 is plugged into the fourth slot, so as to connect the second reinforcing piece 40 and the supporting beam 20 by plugging.

Further, in these examples, the fourth slot is made on the second reinforcing piece 40, and the fourth boss 23 is disposed protrusively on the supporting beam 20, so that the second reinforcing piece 40 and the supporting beam 20 can fit each other by plugging. The fourth boss 23 and the supporting beam 20 may be formed in one piece, or the fourth boss 23 and the supporting beam 20 are formed separately, and then the fourth boss 23 and the supporting beam 20 are fixed to each other.

Further, the second reinforcing piece 40 in these examples is a hollow structure, and the fourth slot in the preceding examples is a hollow groove formed in the second reinforcing piece 40.

In some examples, the inner wall face of the fourth slot in the second reinforcing piece 40 is bonded and fixed to the outer wall face of the fourth boss 23. The clearance between the fourth slot and the fourth boss 23 is filled with a binder to prevent relative wobbles between the second reinforcing piece 40 and the supporting beam 20 and prevent impurities from accumulating in the clearance between the fourth boss 23 and the fourth slot. In some examples, the fourth boss 23 and the supporting beam 20 may be made of the same material and/or process.

In some examples, the second reinforcing piece 40 is bonded to the supporting beam 20. In these examples, after the second reinforcing piece 40 and the supporting beam 20 are separately molded, the second reinforcing piece 40 is bonded to the supporting beam 20, thereby simplifying the mold for forming the second reinforcing piece 40 and the supporting beam 20. In these examples, the second reinforcing piece 40 may be directly bonded to the supporting beam 20, or the second reinforcing piece 40 may be bonded and fixed to the supporting beam 20 through a connecting piece 60. Further, in some examples, the fourth boss 23 mentioned in any one of the above examples is disposed on the supporting beam 20. The second reinforcing piece 40 is bonded to the fourth boss 23. The fourth boss 23 serves as an intermediate connecting piece between the second reinforcing piece 40 and the supporting beam 20.

In some examples, the supporting beam 20 includes a lower surface, and the lower surface of the supporting beam 20 is a plane. To move the pallet, the lower surface of the supporting beam 20 may serve to fit with an external supporting structure. By making the lower surface of the supporting beam 20 be a plane, the contact area between the supporting beam 20 and the external supporting structure is larger, thereby improving the stability of the pallet. The supporting beam 20 is disposed in the mounting space inside the external fixing rack 10. To achieve a good fit between the supporting beam and the external supporting structure, the supporting structure may be placed under the pallet, and the supporting structure may abut on the lower surface of the supporting beam 20, so as to enable operations such as lifting for the pallet.

In some examples, the upper surface of the supporting beam 20 is a plane, so as to facilitate molding. Further, in some examples, the supporting beam 20 is of a cuboidal structure as a whole. In some examples, the external fixing rack 10 includes a lower surface, and the lower surface of the external fixing rack 10 is a plane.

In some examples, at least two of the supporting beams 20 are arranged in parallel. The two parallel supporting beams 20 may be configured to fit with the external supporting structure, so as to facilitate arrangement of the external supporting structure and adaptation to other equipment. Further, in these examples, the plurality of supporting beams 20 are spaced apart along the first direction, and the plurality of supporting beams 20 are arranged parallel to each other. Further, the lower surfaces of the plurality of supporting beams 20 are all planes, so that the lower surface of any supporting beam 20 can fit with the external supporting structure.

Figure 6:
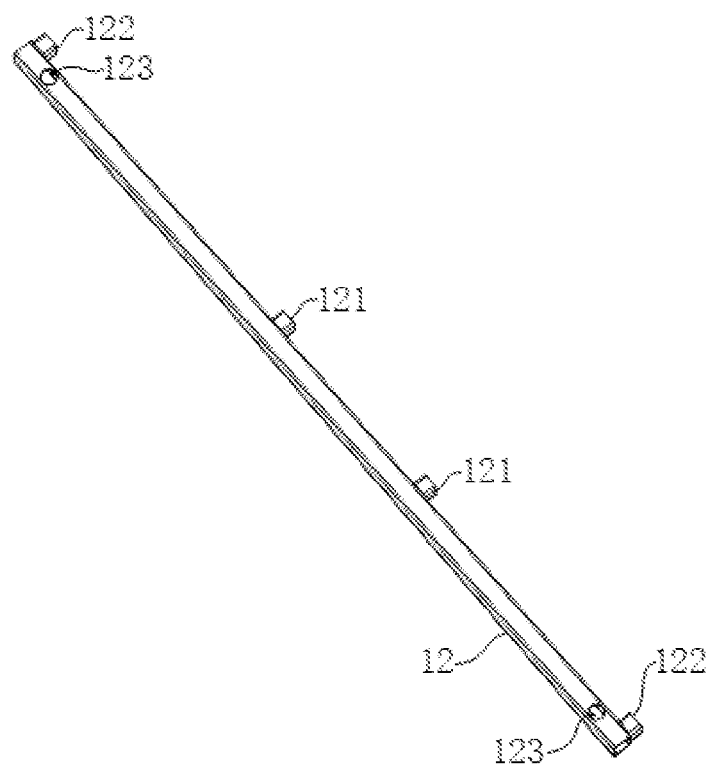
FIG. 6 is a schematic structural diagram of another example of a second fixing beam according to this application.
Figure 10:
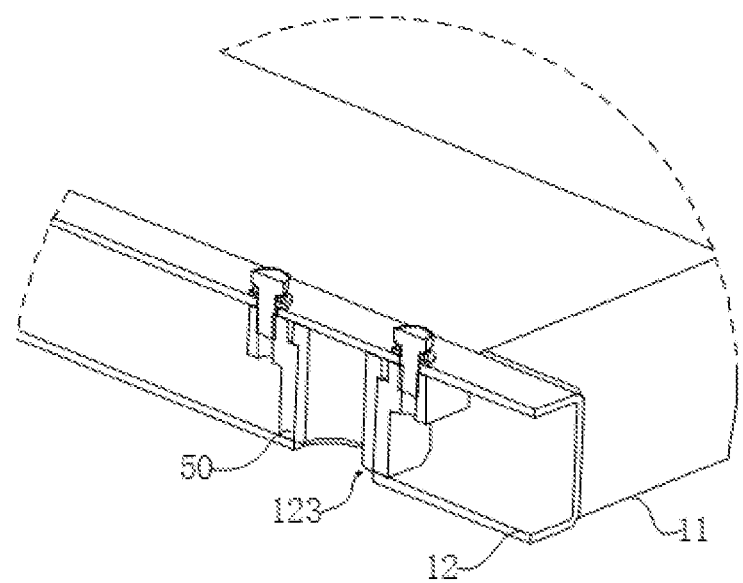
FIG. 10 is a close-up view of a part 9A shown in FIG. 9.

Referring to FIG. 6, FIG. 9, and FIG. 10, in some examples, a pin hole 123 is made on the external fixing rack 10. The pin hole 123 is configured to fit with the external structure to facilitate the fixing of the pallet. Using an example in which the pin hole 123 fits with an external pin, when the external pin is plugged into the pin hole 123, the movement of the pallet in an axial direction of the pin is restricted by the fit between the pin and the pin hole 123. To move the pallet to the chemical formation equipment or other equipment, the relative displacement of the pallet can be limited by using the fit between the pin hole 123 and the external structure, so as to fix the pallet and keep the battery cell 80 in a preset position on the pallet.

Further, in some examples, the pin hole 123 is made on the lower surface of the external fixing rack 10, so that the external structure such as a pin can be plugged into the pin hole 123 of the external fixing rack 10 from below the pallet, thereby restricting the relative movement of the pallet.

In some examples, different from the preceding examples, the external fixing rack 10 includes an inner surface oriented toward the mounting space and an outer surface away from the mounting space. The pin hole 123 in the preceding examples runs through to the outer surface of the external fixing rack 10.

In some examples, different from the preceding examples, the external fixing rack 10 includes an upper surface. The pin hole 123 in the preceding examples runs through to the upper surface of the external fixing rack 10.

Figure 11:
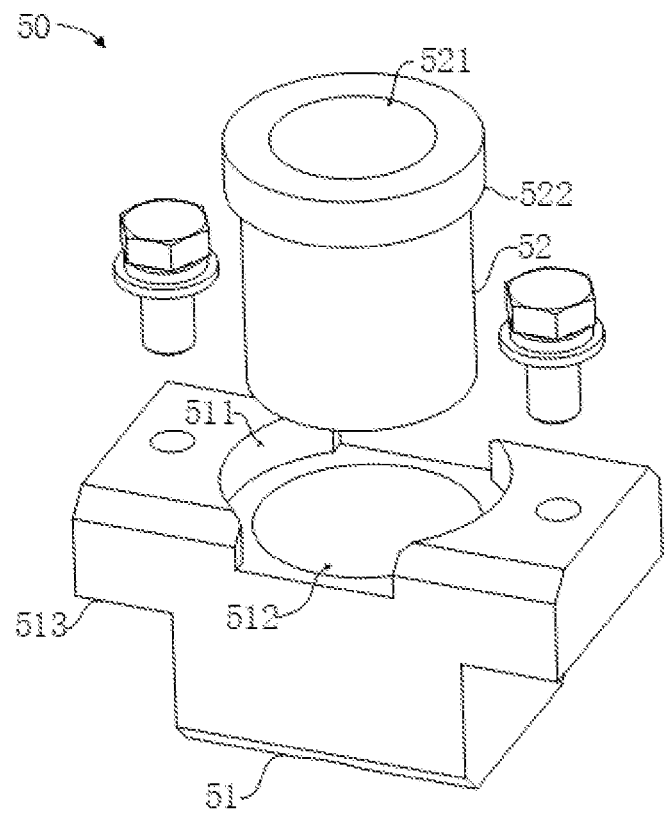
FIG. 11 is a schematic exploded view of an example of a limiting assembly according to this application.

Referring to FIG. 9, FIG. 10, and FIG. 11, in some examples, the pallet further includes a limiting assembly 50 mounted in the external fixing rack 10. The pin hole 123 is made on the limiting assembly 50, and a via-hole 521 is made on the external fixing rack 10 at a position corresponding to the pin hole 123.

In these examples, the limiting assembly 50 is configured to form the pin hole 123. The pin hole 123 may be a through-hole or a counterbore made on the limiting assembly 50. The position of the via-hole 521 on the external fixing rack 10 corresponds to the position of the pin hole 123, so that the structures such as an external pin can run through the via-hole 521 and be inserted into the pin hole 123.

In some examples, the external fixing rack 10 is of a hollow structure, and the limiting assembly 50 is mounted in the external fixing rack 10.

With the pin hole 123 formed by the limiting assembly 50, when the structures such as a pin is inserted into the pin hole 123, the pin hole 123 fits with the pin to prevent the pin from abrading the inner wall face of the via-hole 521, and increase the structural strength of a part that is of the external fixing rack 10 and that fits with the pin.

Further, in some examples, the limiting assembly 50 includes a fixing block 51 and a pin sleeve 52. The fixing block 51 is fixedly mounted in the external fixing rack 10. The pin sleeve 52 is fixedly mounted on the fixing block 51. The pin hole 123 is made on the pin sleeve 52. The fixing block 51 in these examples serves as an intermediate connecting piece between the pin sleeve 52 and the external fixing rack 10. The pin sleeve 52 may be fixedly connected to the fixing block 51, or the pin sleeve 52 may be detachably connected to the fixing block 51.

The fixing block 51 may be fixed onto the external fixing rack 10 by bonding or other means. In some examples, a screw hole 124 is made on the external fixing rack 10. The fixing block 51 is mounted on the external fixing rack 10 by a screw that runs through the screw hole 124.

Further, in some examples, a first limiting hole 511 and a second limiting hole 512 that communicates with the first limiting hole 511 are made on the fixing block 51 at a position corresponding to the via-hole 521. The second limiting hole 512 is located between the first limiting hole 511 and the via-hole 521. The inside diameter of the first limiting hole 511 is greater than the inside diameter of the second limiting hole 512. A limiting boss 522 is disposed protrusively on the outer wall of the pin sleeve 52. A major outside diameter of the limiting boss 522 is greater than the inside diameter of the second limiting hole 512. The limiting boss 522 is plugged into the first limiting hole 511. The pin sleeve 52 is plugged into the second limiting hole 512.

In these examples, the first limiting hole 511 and the second limiting hole 512 may be coaxial holes, so as to facilitate molding and processing. The inside diameter of the second limiting hole 512 may be equal to the inside diameter of the via-hole 521. The first limiting hole 511 is located at an end that is of the second limiting hole 512 and that is away from the via-hole 521. The inside diameter of the first limiting hole 511 is greater than the inside diameter of the second limiting hole 512, so that the first limiting hole 511 and the second limiting hole 512 form an approximately step-shaped hole structure in the fixing block 51. The limiting boss 522 on the outer wall of the pin sleeve 52 is configured to fit with the first limiting hole 511. The inside diameter of the second limiting hole 512 is less than the major outside diameter of the limiting boss 522. When the limiting boss 522 is plugged into the first limiting hole 511, the limiting boss 522 is obstructed outside the second limiting hole 512 to prevent the limiting boss 522 from moving along the axial direction of the second limiting hole 512. When the pin sleeve 52 is plugged into the second limiting hole 512, the limiting boss 522 fits with the first limiting hole 511 to restrict the maximum depth by which the pin sleeve 52 is inserted into the second limiting hole 512. Because the first limiting hole 511 is located at an end that is of the second limiting hole 512 and that is away from the via-hole 521, when the pin sleeve 52 is plugged into the second limiting hole 512, the pin sleeve 52 is obstructed by the limiting boss 522, so as to define the relative position between the pin sleeve 52 and the via-hole 521, and keep the pin sleeve 52 in the preset position relative to the external fixing rack 10.

In some examples, a convex lug 513 is disposed on the fixing block 51. The convex lug 513 is connected and fixed to the external fixing rack 10. The convex lug 513 is disposed protrusively on the fixing block 51. The convex lug 513 serves as an intermediate connecting piece between the fixing block 51 and the external fixing rack 10 to facilitate mounting of the fixing block 51. In some examples, a threaded hole 114 is made on the convex lug 513, and a screw hole 124 is made on the external fixing rack 10. A screw is disposed on the external fixing rack 10. The screw runs through the screw hole 124 on the external fixing rack 10, and is threadedly connected to the threaded hole 114 on the convex lug 513. In some examples, both the convex lug 513 and the fixing block 51 are bonded and fixed to the inner wall face of the external fixing rack 10. The convex lug 513 can increase the contact area between the limiting assembly 50 and the external fixing rack 10, thereby improving the stability of the fixing block 51.

In some examples, the convex lug 513 is disposed at an end that is of the fixing block 51 and that is away from the via-hole 521. Because the convex lug 513 can serve as an intermediate connecting piece between the external fixing rack 10 and the fixing block 51, when the convex lug 513 is disposed away from the via-hole 521, a connecting piece 60 such as a screw configured to connect the convex lug 513 can be disposed away from the via-hole 521 to reduce the operations such as hole drilling on the same surface of the external fixing rack 10. Further, the convex lug 513 in these examples are connected to the external fixing rack 10 by the screw in the preceding examples.

Figure 12:
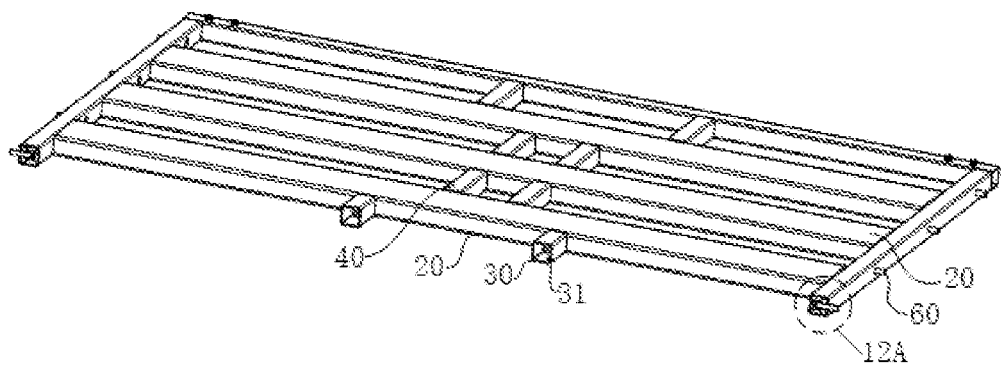
FIG. 12 is a schematic structural diagram of another example of a pallet according to this application.

Referring to FIG. 1 and FIG. 12, in some examples, the external fixing rack 10 includes two first fixing beams 11 and two second fixing beams 12. The two first fixing beams 11 and the two second fixing beams 12 are connected alternately end-to-end along a third direction, so that the two first fixing beams 11 and the two second fixing beams 12 close in to form the mounting space. The ends of at least two supporting beams 20 are connected and fixed to the two first fixing beams 11 respectively.

In these examples, the two first fixing beams 11 are spaced apart, and the two second fixing beams 12 are spaced apart. The two first fixing beams 11 and the two second fixing beams 12 are connected alternately end-to-end to form a quadrilateral structure. Further, the two first fixing beams 11 are equal in length, and the two second fixing beams 12 are equal in length, so that the external fixing rack 10 forms a cuboidal structure. Further, in these examples, the length of the first fixing beam 11 is less than the length of the second fixing beam 12.

In these examples, the ends of at least two supporting beams 20 are connected and fixed to the two first fixing beams 11 respectively. The ends of the supporting beam 20 means the two ends of the supporting beam 20 along the second direction. Further, the two first fixing beams 11 are disposed at the two ends of the supporting beam 20 along the second direction respectively, and the two second fixing beams 12 are disposed on the two sides of the supporting beam 20 along the first direction respectively. In these examples, each of a plurality of supporting beams 20 is connected to the two first fixing beams 11 separately. The third direction in these examples means a clockwise or counterclockwise direction.

The two first fixing beams 11 and the two second fixing beams 12 coordinate to form the external fixing rack 10 and define a mounting space in the external fixing rack 10. Because the first fixing beam 11 and the second fixing beam 12 can be molded separately, the mold for processing the corresponding structures is effectively simplified, and the processing efficiency of the product is improved. In some examples, both the first fixing beam 11 and the second fixing beam 12 are of a hollow tubular structure to reduce the overall weight of the external fixing rack 10. In some examples, both the first fixing beam 11 and the second fixing beam 12 are made of a carbon fiber material, so as to enhance the structural strength and corrosion-resistance performance of the first fixing beam 11 and the second fixing beam 12.

Still referring to FIG. 3 to FIG. 6, in some examples, a fifth boss 122 is disposed protrusively on the second fixing beams 12, and a fifth slot 112 is made on the first fixing beams 11. The fifth boss 122 is plugged into in the fifth slot 112 to connect the first fixing beams 11 to the second fixing beams 12.

In these examples, the fifth slot 112 is a groove that is recessed on the first fixing beam 11. The fifth boss 122 is connected to the second fixing beam 12. When the fifth boss 122 is plugged into the fifth slot 112, the movement of the first fixing beam 11 in the length direction of the second fixing beam 12 is obstructed by the fifth boss 122. In some examples, the fifth boss 122 and the second fixing beam 12 are formed in one piece. In some examples, after the second fixing beam 12 and the fifth boss 122 are molded separately, the fifth boss 122 is mounted onto the second fixing beam 12. In some examples, the first fixing beam 11 is of a hollow tubular structure, and the fifth slot 112 is a part of the hollow structure of the first fixing beam 11.

In some examples, different from the preceding examples, the fifth slot 112 is made on the second fixing beam 12, and the fifth boss 122 is disposed on the first fixing beam 11.

In some examples, the fifth boss 122 is also bonded to the fifth slot 112. The clearance between the fifth boss 122 and the fifth slot 112 is filled with a binder to prevent contamination caused by impurities that enter the clearance between the two components. In some examples, the first fixing beam 11 is of a hollow tubular structure. After the fifth boss 122 is plugged into the fifth slot 112, the clearance between the two components is sealed by the binder to prevent the impurities from accumulating in the first fixing beam 11, and prevent the impurities from affecting the process when the pallet enters the process equipment such as chemical formation equipment.

In some examples, the fifth boss 122 is plugged to the second fixing beam 12. In this way, the fifth boss 122 and the second fixing beam 12 can be molded separately, and the molding steps are simplified. In these examples, the fifth boss 122 and the second fixing beam 12 may be made of the same material.

In some examples, the fifth boss 122 is bonded to the second fixing beam 12. The practice of bonding makes it convenient to mold the fifth boss 122 and the second fixing beam 12 separately and then assemble them together. The practice of bonding reduces the operations such as hole drilling on the second fixing beam 12, and increases the structural strength of the second fixing beam 12.

Further, in some examples, after the fifth boss 122 is bonded to the fifth slot 112, the fifth boss 122 is bonded to the second fixing beam 12, thereby improving the bonding efficiency of the fifth boss 122. Because the binder can directly fill the clearance between the fifth boss and the fifth slot 112 and the clearance between the fifth boss 122 and the second fixing beam 12, the impurities can be effectively prevented from accumulating in the clearance between the connecting pieces 60 at different parts.

Figure 13:
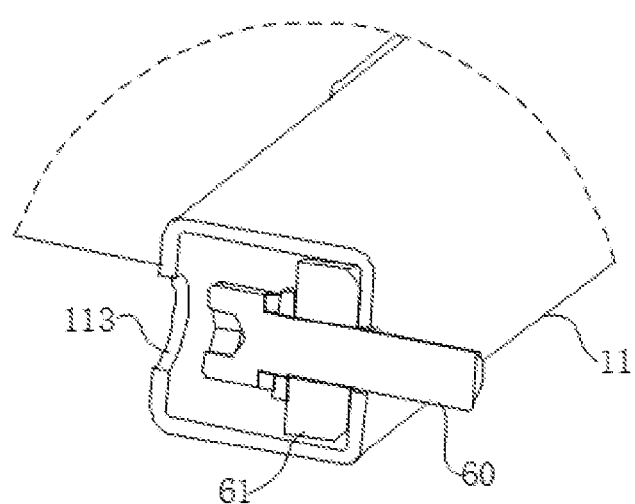
FIG. 13 is a close-up view of a part 12A shown in FIG. 12.
Figure 14:
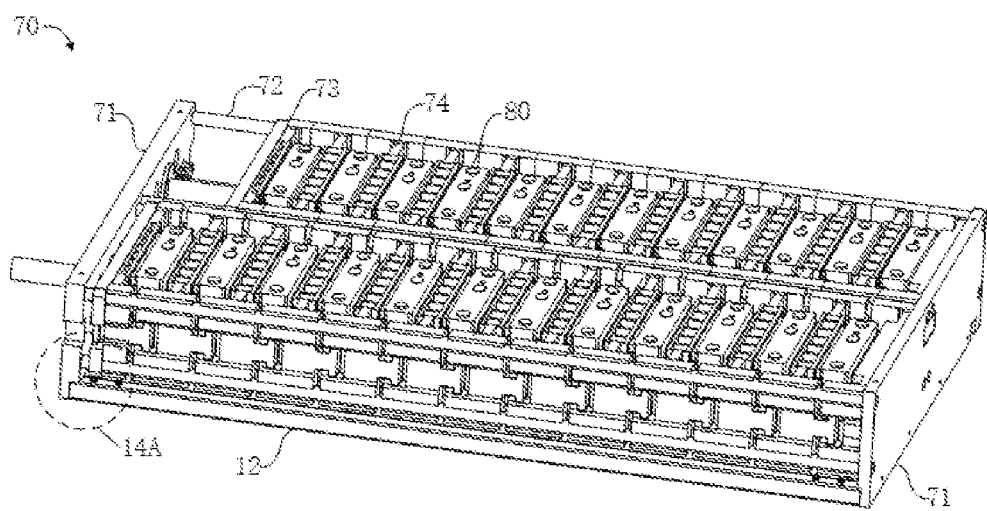
FIG. 14 is a schematic structural diagram of an example of a battery restraint apparatus according to this application.
Figure 15:
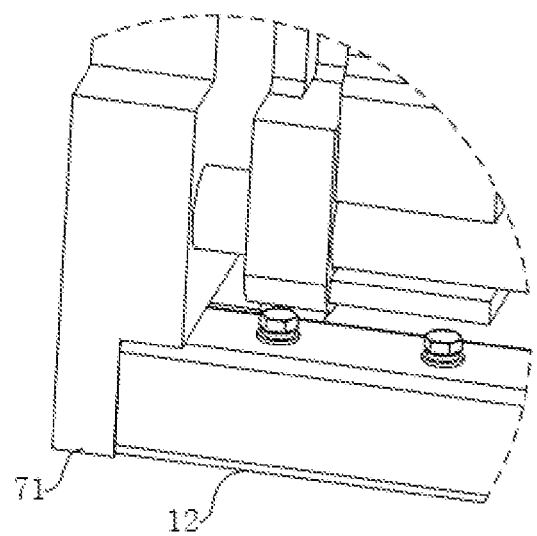
FIG. 15 is a close-up view of a part 14A shown in FIG. 14.

Referring to FIG. 13, FIG. 14, and FIG. 15, on the basis of the above pallet examples, this application further discloses an example of a battery restraint apparatus 70. The battery restraint apparatus 70 is configured to restrain a battery cell 80. The battery restraint apparatus 70 includes the pallet according to any one of the above examples and an end plate 71. The end plate 71 is connected to an external fixing rack 10.

In this example, the battery cell 80 is placed on the pallet, and the supporting beam 20 of the pallet is configured to bear the battery cell 80. The end plate 71 is configured to obstruct the battery cell 80 from moving along a surface of the pallet. Further, in this example, the end plate 71 is disposed at two ends of the pallet in the length direction to prevent the battery cell 80 from moving along the length direction of the pallet.

Understandably, the example of this application is merely an illustration of the pallet, and the battery cell 80 restraint apparatus 70 described in this example may further include other functional components such as a screw rod 72, a push plate 73, and a fixing plate 74 to achieve the effect of restraining the battery cell 80.

In some examples, the end plate 71 is connected to the first fixing beam 11 to restrict the battery cell 80 from at least two ends of the pallet. The end plate 71 in this example may be directly connected and fixed to the first fixing beam 11 by at least one of the following means: bolt, snap-fastening, pin, key-in connection, or welding; or, the first fixing beam 11 may be connected and fixed to the end plate 71 by an intermediate connecting piece.

Referring to FIG. 13, in some examples, the external fixing rack 10 includes an inner wall face oriented toward the mounting space and an outer wall face oriented away from the mounting space. The pallet further includes: a connecting piece 60, connected to the external fixing rack 10 and at least partly protruding from the outer wall face of the external fixing rack 10. The end plate 71 is connected to the external fixing rack 10 by the connecting piece 60.

Referring to FIG. 15, the connecting piece 60 in these examples is at least partly connected to the external fixing rack 10 to serve as an intermediate connecting piece between the external fixing rack 10 and the end plate 71. Further, in some examples, the external fixing rack 10 is formed by combining the first fixing beams 11 and the second fixing beams 12 mentioned in any one of the above examples. The connecting piece 60 is connected to the first fixing beams 11. A through-hole and a reserved hole 113 are made on the first fixing beam 11. The reserved hole 113 runs through to the outer wall face of the external fixing rack 10. A gasket 61 is disposed in the first fixing beam 11. The outside diameter of the gasket 61 is greater than the outside diameter of the through-hole. After the connecting piece 60 extends into the first fixing beam 11 through the reserved hole 113 on the first fixing beam 11, the end of the connecting piece 60 passes through the gasket 61 and the through-hole, and protrudes out of the outer wall face of the first fixing beam 11 to connect the connecting piece 60 to the end plate 71. Understandably, the restraint apparatus according to this application is applicable to various types of equipment such as chemical formation machines and capacity grading machines.

It is hereby noted that because the example of the battery restraint apparatus 70 according to this application is based on the pallet described in the pallet examples above, the example of the battery restraint apparatus 70 according to this application includes all the technical solutions of all the examples of the pallet, and achieves the same technical effects, details of which are omitted here.

Referring to FIG. 1 to FIG. 15, in some examples, the pallet is configured to bear a battery cell 80 when the battery cell 80 undergoes a process such as chemical formation. The pallet includes an external fixing rack 10 and a plurality of supporting beams 20 disposed inside the external fixing rack 10. At least two supporting beams 20 are spaced apart to reduce the overall weight of the pallet. In these examples, the external fixing rack 10 is a rectangular structure defined by the two first fixing beams 11 and the two second fixing beams 12 that are connected to each other. Each of a plurality of supporting beams 20 is connected to the two first fixing beams 11 separately. In these examples, both the supporting beams 20 and the external fixing rack 10 may be made of a carbon fiber material to enhance the corrosion-resistance performance of the pallet. To assemble the supporting beams 20 and the external fixing rack 10, the first boss 111 may fit into the first slot 21 to implement the assembling of the supporting beams 20. To prevent the supporting beams 20 from wobbling, the clearance between the first boss 111 and a joint surface of the first slot is filled with a binder to prevent abrasion caused by the wobble of the supporting beams 20. In these examples, a first reinforcing piece 30 is disposed between a supporting beam 20 and the external fixing rack 10. A second reinforcing piece 40 is disposed between adjacent supporting beams 20. The first reinforcing piece 30 and the second reinforcing piece 40 may also be made of a carbon fiber material. To facilitate movement and stacking of products, a pin hole 123 is made on the external fixing rack 10. The pin hole 123 fits with an external structure such as a pin to fix the pallet and limit the position of the pallet. A connecting piece 60 configured to connect the end plate 71 is disposed on the external fixing rack 10 to facilitate position limitation for the end plate 71 during restraint of the battery cell 80. In these examples, different components may be connected to each other by a binder. Before the binder is solidified, the positions of corresponding components are adjustable to implement fine-tuning of the position of the corresponding structure.

What is described above is merely some optional examples of this application, and does not hereby limit the patent scope of this application in any way. All equivalent structural variations made by using the content of the specification and the drawings of this application, and the content hereof used directly or indirectly in other related technical fields without departing from the inventive conception of this application, still fall within the patent protection scope of this application.

What is claimed is:

1. A pallet, configured to bear a battery cell, wherein the pallet comprises:
    an external fixing rack, wherein a mounting space is formed inside the external fixing rack; and
    a plurality of supporting beams, disposed in the mounting space, wherein the plurality of supporting beams are arranged along a first direction, the plurality of supporting beams are connected to the external fixing rack separately, at least two of the supporting beams are spaced apart, and the plurality of supporting beams are configured to bear the battery cell; and, wherein a pin hole is made on the external fixing rack and pallet further comprises:
    a limiting assembly, mounted in the external fixing rack, the pin hole is made on the limiting assembly, and a via-hole is made on the external fixing rack at a position corresponding to the pin hole, wherein the limiting assembly comprises:
    a fixing block, fixedly mounted in the external fixing rack;
    a pin sleeve, fixedly mounted on the fixing block, wherein the pin hole is made on the pin sleeve;
    a first limiting hole and a second limiting hole communicating with the first limiting hole made on the fixing block at a position corresponding to the via-hole, wherein the second limiting hole is located between the first limiting hole and the via-hole, and an inside diameter of the first limiting hole is greater than an inside diameter of the second limiting hole; and
    a limiting boss disposed protrusively on an outer wall of the pin sleeve, wherein a major outside diameter of the limiting boss is greater than the inside diameter of the second limiting hole, the limiting boss is plugged into the first limiting hole, and the pin sleeve is plugged into the second limiting hole.

2. The pallet according to claim 1, wherein the external fixing rack and/or the supporting beams are of a hollow tubular structure; and/or
    the external fixing rack and/or the supporting beams are made of a carbon fiber material.

3. The pallet according to claim 1, wherein a first boss is disposed on one of the supporting beams or the external fixing rack, a first slot is recessed in the other thereof, and the first boss is plugged into the first slot to connect the supporting beams to the external fixing rack.

4. The pallet according to claim 3, wherein the first boss is also bonded to the first slot; and/or
    the first boss is disposed on the external fixing rack, and the first boss is bonded to the external fixing rack.

5. The pallet according to claim 1, wherein the pallet further comprises:
    a first reinforcing piece, wherein at least one of the supporting beams is connected to the external fixing rack by the first reinforcing piece.

6. The pallet according to claim 5, wherein the first reinforcing piece is plural in number, the plurality of first reinforcing pieces are spaced apart along a second direction, and the second direction intersects the first direction.

7. The pallet according to claim 5, wherein the first reinforcing piece is plugged and/or bonded to the external fixing rack.

8. The pallet according to claim 5, wherein the supporting beams are plugged and/or bonded to the first reinforcing piece.

9. The pallet according to claim 1, wherein the pallet further comprises:
a second reinforcing piece, wherein adjacent supporting beams are connected to each other by the second reinforcing piece.

10. The pallet according to claim 9, wherein the second reinforcing piece is plugged and/or bonded to the supporting beams.

11. The pallet according to claim 1, wherein each of the supporting beams comprises a lower surface, and the lower surface of the supporting beam is a plane; and/or
at least two of the supporting beams are arranged in parallel.

12. The pallet according to claim 1, wherein a convex lug is disposed on the fixing block, and the convex lug is connected and fixed to the external fixing rack.

13. The pallet according to claim 12, wherein the convex lug is disposed at an end that is of the fixing block and that is away from the via-hole.

14. The pallet according to claim 1, wherein the external fixing rack comprises:
two first fixing beams; and
two second fixing beams, wherein the two first fixing beams and the two second fixing beams are connected alternately end-to-end along a third direction, so that the two first fixing beams and the two second fixing beams close in to form the mounting space; and
ends of at least two supporting beams are connected and fixed to the two first fixing beams respectively.

15. The pallet according to claim 14, wherein a fifth boss is disposed protrusively on the second fixing beams, a fifth slot is made on the first fixing beams, the fifth boss is plugged into in the fifth slot to connect the first fixing beams to the second fixing beams.

16. The pallet according to claim 15, wherein the fifth boss is also bonded to the fifth slot; and/or the fifth boss is plugged and/or bonded to the second fixing beams.

* * * * *